Oct. 5, 1965 — A. DELFORGE — 3,210,148
WATER, ISOPROPANOL AND HEXANE SCOURING OF WOOL
Filed Dec. 12, 1961
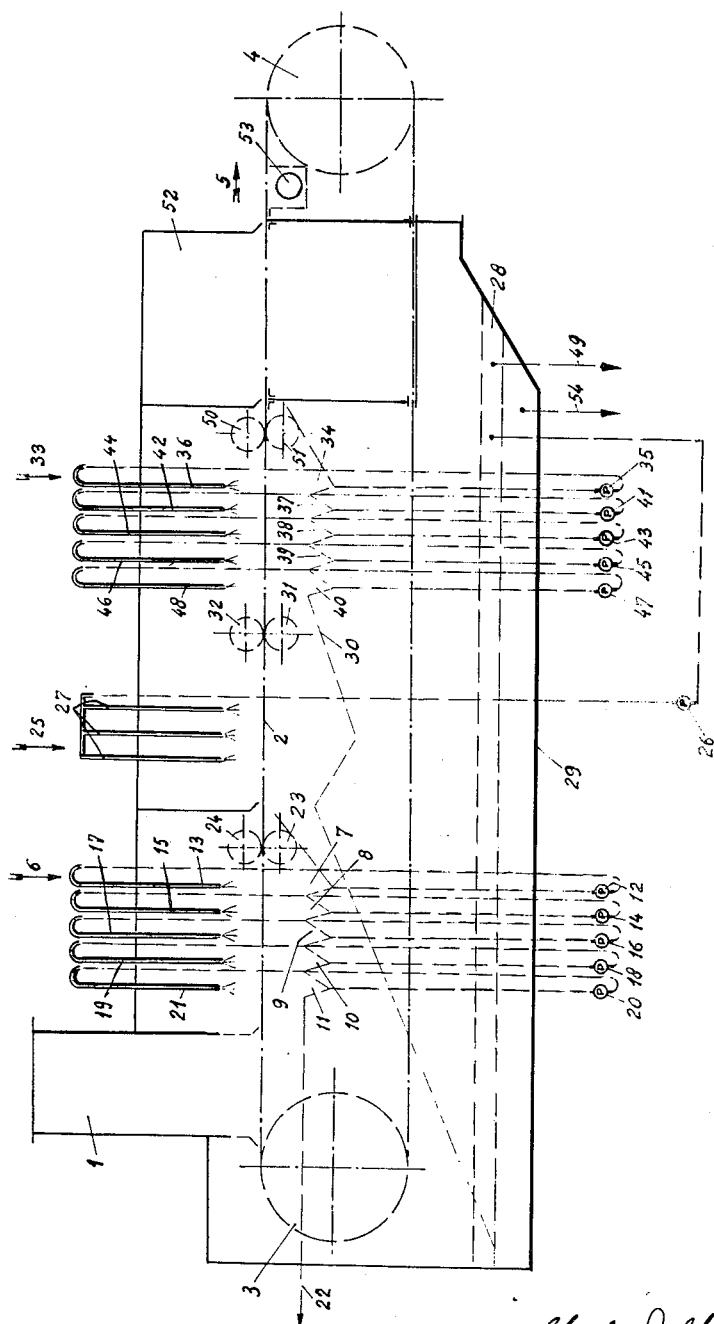

United States Patent Office 3,210,148
Patented Oct. 5, 1965

3,210,148
WATER, ISOPROPANOL AND HEXANE SCOURING OF WOOL
Alfred Delforge, Schoten, Belgium, assignor to Extraction continue de Smet, société anonyme, Antwerp, Belgium
Filed Dec. 12, 1961, Ser. No. 158,748
Claims priority, application Luxembourg, Dec. 15, 1960, 39,539
1 Claim. (Cl. 8—139.1)

This invention relates to a process for treating wool, wherein wool is submitted separately to a treatment with water an to a treatment with a hydrocarbon solvent.

It is known that raw wool has to undergo various operations before it may be submitted to spinning. As a matter of fact, raw wool comprises a substantial amount of impurities and chemical substances which are to be removed before the wool may be sent to spinning. Thus lanoline, suint, and such foreign matter, sands and earths must be eliminated; straw and grass fragments must also be removed but this is made by carding.

The usual process for treating wool includes a succession of washings with lukewarm or warm water comprising soaps and detergents.

This allows to eliminate suint; lanoline is brought in colloidal suspension in water and some impurities, such as sands and earths, are also eliminated with water.

This usual process has however considerable drawbacks; it allows only with difficulty to recover lanoline and suint is also lost; furthermore, the wool so treated felts, which causes breaking of fibers during carding.

It has already been proposed to treat wool successively with water, an alcohol and an ether, the alcohol replacing the water prior to the treatment of the wool with the ether. But this known procedure does not provide for the progressive replacement of the water by the alcohol, thus resulting in complicated manipulations which, in practice, are economically prohibitive. Moreover, the known processes do not make it possible to treat the wool in a continuous manner, with water, an alcohol and hydrocarbon solvent as well as to dry and to cool the wool without additional manipulative steps.

The invention is directed to a process for the complete treatment of raw wool continuously and automatically, which process results in a treated wool of perfect quality. To this end, according to the invention, the wool is placed on a perforated conveyor band, on which in a first zone the wool is sprinkled with water, in a second zone with isopropyl alcohol and in a third zone with a solvent hydrocarbon, after which the wool is dried, being throughout situated on the conveyor band, in a fourth zone and then, still on the conveyor, the wool is re-cooled in a fifth zone.

Other details and particularities of the invention will become apparent from the description of a process for treating wool and of a plant for carrying out said process according to the invention, given hereinafter by way of a non limitative example and with reference to the annexed drawing.

The figure is a schematic view of a plant for treating wool according to the invention.

The wool enters through the inlet 1 on a perforated conveyor band 2. Said band 2 is carried by two drums 3 and 4 one of which causes the band to be driven and has such a movement that the upper portion of the band moves in the direction of the arrow 5. On the band 2, wool is first washed with water; to this end, one may use either pure water, or a slightly alcoholic aqueous mixture.

Water or said aqueous mixture is added at 6 above the upper portion of the conveyor 2. Below said upper portion of the band, a series of overflow tanks 7 to 11 are provided. Pure water or the fresh aqueous mixture having passed through the wool layer is received in the tank 7; said water is partially brought back by means of the pump 12 to the sprayer 13 and overflows partially into the tank 8. As the tank 7, each of the tanks 8 to 11 is connected by means of one of the pumps 14, 16, 18 and 20 to one of the sprayers 15, 17, 19 and 21. A very important flow of water which has already passed through the wool is thus obtained; at the same time, some water overflows from each of the tanks 7 to 10 into the adjacent tank 8 to 11 which is situated on the loading side of the conveyor 2. Water is thus gradually charged with suint and carries away sands and earths, and an aqueous slurry which is removed by 22 is formed in the tank 11.

Said aqueous slurry may be concentrated and may be used to make a dry powder containing nitrogen and potassium an which may be sold as a fertilizer.

The wool so washed with water passes between compressing rollers 23 and 24 without leaving the band and is thus freed from most of the water which is sent into the tank 7.

The wool washed with water and which has passed between the compressing rollers 23 and 24 is then treated with isopropyl alcohol. Isopropyl alcohol may be added in 25 and may also be brought by means of the pump 26 the delivery side of which is connected to the sprayers 27. The pump 26 is fed by the upper phase 28 of the liquid collected in the decantation vat 29; said upper phase 28 is rich in isopropyl alcohol. The isopropyl alcohol which is thus sprayed on the wool carries away the water and is collected by the vat 30. The liquid of the vat 30 is directed into the decantation vat 29 the upper phase of which is recirculated through the pump 26.

Always without leaving the band, the wool treated with isopropyl alcohol or at least with a miscella rich in isopropyl alcohol and thus freed from the water thereof is brought between the compressing rollers 31 and 32. The wool looses thus most of the isopropyl alcohol or of said miscella contained therein; said liquid is directed into the tank 30.

Finally, the wool is treated with hexane or at least with a miscella rich in hexane and poor in isopropyl alcohol. The hexane is for example admitted at 33 above the overflow tank 34. Pure hexane of the miscella rich in hexane having passed through the wool layer is received into the tank 34; this liquid is partially recirculated by means of the pump 35 to the sprayer 36 and overflows partially into the tank 37. As the tank 34, each of the tanks 37 to 40 is connected by means of one of the pumps 41, 43, 45 and 47 to one of the sprayers 42, 44, 46 and 48. A very important circulation of the hexane having already passed through the wool is thus obtained; at the same time, each of the tanks 34, 37, 38 and 39 overflows into the adjacent tank situated on the loading side of the conveyor 2. The miscella rich in hexane is thus charged gradually with lanoline and other substances which are soluble in hexane. The tank 40 overflows finally into the tank 30, so that the liquids issuing from the treatment with hexane and isopropyl alcohol are finally entirely led into the decantation vat 29.

The two phases issuing from the decantation in the decantation vat 29 are removed at 49 and 54. This decantation is ten times more rapid because of the presence of isopropyl alcohol.

Another advantage of the process according to the invention resides in the fact that the miscella is clear and obtained as a mixture with isopropyl alcohol, which favours the application of a neutralization process in a solvent medium wherein isopropyl alcohol is advantageously used as third solvent.

The wool treated with hexane passes between the compression rollers 50 and 51 which expels therefrom the liquid which is directed into the tank 34.

Always without leaving the band, the wool passes through the drying apparatus 52 wherein the solvents are eliminated according to a known process by means of a superheated vapour of hexane, isopropyl alcohol and eventually of an inert gas.

Finally, while remaining on the band 2, the wool is cooled by means of a vigorous cold air stream formed by a fan 53.

From the preceding description, it results that the complete treatment is carried out without the wool leaving the band. The cost of labour is thus reduced at the minimum. All the byproducts, such as neutral lanoline, fatty acids and dry suint, may be recovered. There are not waste products which contaminate the residual waters. Nor the wool, nor the lanoline are brought to a high temperature.

Due to the fact that the operations are all made on a same band without the wool is stirred, the fibres remain parallel. The piles are longer and there is accordingly less loss on the combs. The yield of production is higher on the card. The process gives a wool which is clean, unfelted, scoured and ready for treating on the card. The process is economical as well with respect to the electrical energy as with respect to the thermal energy.

It has to be understood that the invention is not limited to the embodiment hereinbefore described and that many changes may be brought therein without departing from the scope of the present invention.

Thus, for example, the treatment with hexane may precede the treatment with water.

I claim:

A process for the treatment of raw wool preparatory to spinning which comprises
(1) continuously moving said wool by conveyor belt means from an inlet position to an outlet position, while successively performing the steps of
   (a) spraying said wool with water, whereby water-soluble impurities and loosely held foreign matter are removed,
   (b) pressing said water-sprayed wool between compressor rollers to remove water and foreign matter therefrom, said water and foreign matter being collected in the first container means,
   (c) spraying the resultant compressed wool with isopropyl alcohol to remove substantially all the water therefrom,
   (d) pressing said alcohol-sprayed wool between compressor rollers to remove alcohol therefrom, said alcohol being collected in second container means,
   (e) spraying the resultant compressed wool with hexane,
   (f) pressing said sprayed wool between compression rollers to remove hexane therefrom, said hexane being collected in third container means,
   (g) passing the said removed hexane from said third container means into said second container means to thereby form a bi-layer liquid mass, the upper layer of which is recirculated to the spraying step in (c),
(2) drying said wool in a drying zone adjacent said outlet position, and
(3) cooling said dried wool in a cooling zone adjacent said drying zone.

References Cited by the Examiner

UNITED STATES PATENTS

| | | | |
|---|---|---|---|
| 163,729 | 5/75 | Braun | 8—139.1 |
| 899,339 | 9/08 | Shuman | 8—139.1 |
| 1,338,307 | 4/20 | Krause | 8—129.5 |
| 1,810,660 | 6/31 | Kritchevsky | 8—139.1 X |

FOREIGN PATENTS 14,114  1892  Great Britain.

NORMAN G. TORCHIN, *Primary Examiner.*
MORRIS O. WOLK, *Examiner.*